United States Patent [19]
Ang et al.

[11] Patent Number: 5,500,670
[45] Date of Patent: Mar. 19, 1996

[54] ASYMMETRIC SPATIAL FILTERING FOR PULSED IMAGING, PULSE WIDTH MODULATION RASTER OUTPUT SCANNER WITH TRI-LEVEL EXPOSURE

[75] Inventors: Anthony Ang, Long Beach; Chye S. Tan, Ontario, both of Calif.

[73] Assignee: Xerox Corporation, Stamford, Conn.

[21] Appl. No.: 116,930

[22] Filed: Sep. 7, 1993

[51] Int. Cl.⁶ .................................................. B41J 2/47
[52] U.S. Cl. .......................................... 347/253; 358/296
[58] Field of Search ................................. 347/119, 135, 347/253, 255, 259, 261, 232; 358/298, 300, 302

[56] References Cited

U.S. PATENT DOCUMENTS 5,223,857  6/1993  Loce et al. ............................. 347/255

OTHER PUBLICATIONS

Johnson et al., "Scophony Spatial Light Modulator", *Optical Engineering*, vol. 24, No. 1, Jan./Feb. 1985, pp. 93–100.

*Primary Examiner*—Mark J. Reinhart
*Attorney, Agent, or Firm*—William Propp

[57] ABSTRACT

A pulsed imaging Raster Output Scanner utilizes pulse width modulation in conjunction with asymmetric spatial filtering to prevent overshoot of the intensity and maintain precise intensity levels into the other exposure levels.

6 Claims, 9 Drawing Sheets

5,500,670

ASYMMETRIC SPATIAL FILTERING FOR PULSED IMAGING, PULSE WIDTH MODULATION RASTER OUTPUT SCANNER WITH TRI-LEVEL EXPOSURE

BACKGROUND OF THE INVENTION

The present invention relates generally to a pulsed imaging, non-facet tracked, pulse width modulation Raster Output Scan (ROS) system for creating tri-level exposures at a recording medium such as images at a photosensitive surface, and, more specifically, for asymmetric spatial filtering in the ROS system.

In the practice of conventional bi-level xerography, it is the general procedure to form electrostatic latent images on a charge retentive surface such as a photoconductive member by first uniformly charging the charge retentive surface. The electrostatic charge is selectively dissipated in accordance with a pattern of activating radiation corresponding to original images. The selective dissipation of the charge leaves a bi-level latent charge pattern on the imaging surface where the high charge regions correspond to the areas not exposed by radiation. One level of this charge pattern is made visible by developing it with toner. The toner is generally a colored powder that adheres to the charge pattern by electrostatic attraction. The developed image is then fixed to the imaging surface, or is transferred to a receiving substrate such as plain paper, to which it is fixed by suitable fusing techniques.

In tri-level, highlight color imaging, unlike conventional xerography, upon exposure, three charge levels are produced on the charge-retentive surface. The highly charged (i.e. unexposed) areas are developed with toner of one color, and the area more fully discharged is also developed, but with a toner of a different color. Thus, the charge retentive surface contains three exposure levels; zero exposure, intermediate exposure, and full exposure, which correspond to three charge levels. These three levels can be developed to print, for example, black, white, and a single color.

FIG. 1 is a schematic drawing of a prior art tri-level printing system. As shown, the system utilizes a charge retentive member in the form of a photoconductive belt 10, consisting of a photoconductive surface on an electrically conductive, light-transmissive substrate mounted for movement past a charge station A, an exposure station B, developer station C, transfer station D, and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller, and the latter of which can be used to provide suitable tensioning of the photoreceptor belt 10. Motor 23 rotates roller 18 to advance belt 10 in the direction of arrow 16. Roller 18 is coupled by motor 23 by suitable means such as a belt drive.

As can be seen by further reference to FIG. 2, initially successive portions of belt 10 pass through charging station A, where a corona discharge device such as a scorotron, corotron, or dicorotron, indicated generally by the reference numeral 24, charges the belt 10 to a selectively high uniform positive or negative potential, $V_0$. Any suitable control circuit, as well known in the art, may be employed for controlling the corona discharge device 24.

Next, the charged portions of the photoreceptor surface are advanced through exposure station B. At exposure station B, the uniformly charged surface of belt 10 is exposed by a tri-level raster output scanner (ROS) unit 25, which causes the charge retentive surface to be discharged in accordance with the output from the scanning device. This scan results in three separate discharge regions on the photoreceptor, each region exposed at one of three possible levels: (1) zero exposure which results in a voltage equal to $V_{ddp}$ and will be developed using charged-area-development (CAD); (2) full exposure, which results in a low voltage level $V_C$ and is developed using discharged-area-development (DAD); and (3) intermediate exposure, which yields an intermediate voltage level $V_W$ and does not develop and yields a white region on the print. These voltage levels are shown schematically in FIG. 2. Some typical voltage levels are as follows.

The photoreceptor, which is initially charged to a voltage $V_0$, undergoes dark decay to a level $V_{ddp}$ ($V_{CAD}$) equal to about −900 volts. When exposed at the exposure station B, the photoreceptor is discharged to $V_c$, ($V_{DAD}$) equal to about −100 volts in the highlight (i.e. color other than black) color portions of the image. The photoreceptor is also discharged to $V_w$ ($V_{white}$) equal to −500 volts imagewise in the background (i.e. white), image areas and in the inter-document area. Thus the image exposure is at three levels; zero exposure (i.e. black), intermediate exposure (white) and full exposure (i.e. color). After passing through the exposure station, the photoreceptor contains highly charged areas and fully discharged areas which correspond to CAD and DAD color latent images, and also contains an intermediate level charged area that is not developed.

At development station C, a development system, indicated generally by the reference numeral 30, advances developer materials into contact with the CAD and DAD electrostatic latent images. The development system 30 comprises first and second developer housings 32 and 34. The developer housing 32 contains a pair of magnetic brush rollers 35 and 36. The rollers advance developer material 40 into contact with the photoreceptor for developing the charged-area regions ($V_{CAD}$). The developer material 40, by way of example, contains positively charged black toner. Electrical biasing is accomplished via power supply 41, electrically connected to developer apparatus 32. A suitable DC bias, $V_{bb}$, of approximately −600 volts is applied to the rollers 35 and 36 via the power supply 41.

The developer housing 34 contains a pair of magnetic rolls 37 and 38. The rollers advance developer material 42 into contact with the photoreceptor for developing the discharged-area regions ($V_{DAD}$). The developer material 42, by way of example, contains negatively charged red toner. Appropriate electrical biasing is accomplished via power supply 43 electrically connected to developer apparatus 34. A suitable DC bias, $V_{cb}$, of approximately −400 volts is applied to the rollers 37 and 38 via the bias power supply 43.

Because the composite image developed on the photoreceptor consists of both positive and negative toner, a positive pre-transfer corona discharge member (not shown) is provided to condition the toner for effective transfer to a substrate, using positive corona discharge. The pre-transfer corona discharge member is preferably an AC corona device, biased with a DC voltage to operate in a field sensitive mode, to perform tri-level xerography pre-transfer charging in a way that selectively adds more charge (or at least comparable charge) to the region of the composite tri-level image that must have its polarity reversed. This charge discrimination is enhanced by discharging the photoreceptor carrying the composite developed latent image with light before the pre-transfer charging this minimizes the tendency to overcharge portions of the image which are already at the correct polarity.

Referring again to FIG. 1, a sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the upper most sheet of a stack of copy sheets. Feed rolls rotate to advance the uppermost sheet from the stack into a chute, which directs the advancing sheet of support material into contact with the surface of belt 10 in a timed sequence, so that the developed toner powder image contacts the advancing sheet of support material at transfer station D.

Transfer station D includes a corona generating device 60 which sprays ions of a suitable polarity onto the backside of sheet 58. This attracts the charged toner powder images from the belt 10 to sheet 58. After transfer, the sheet continues to move in the direction of arrow 62 onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68, with the toner powder image contacting fuser roller 66. In this manner, the toner powder image is permanently affixed to sheet 58. After fusing, a chute, not shown, guides the advancing sheet 58 to a catch tray (also not shown), for subsequent removal from the printing machine by the operator.

After the sheet of support material is separated from the photoconductive surface of belt 10, the residual toner particles carried by the non-image areas on the photoconductive surface are removed therefrom. These particles are removed at cleaning station F. A magnetic brush cleaner housing is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining, prior to the charging thereof, for the successive imaging cycle. Stabilization of the white or background discharge voltage level is accomplished by monitoring photoreceptor white discharge level in the inter-document area of the photoreceptor using an electrostatic voltmeter (ESV) 70. The information obtained thereby is utilized by control logic 72 to control the output of ROS unit 25 so as to maintain the white discharge level at a predetermined level. Further details of this stabilization technique are set forth in U.S. Pat. No. 4,990,955, assigned to the same assignee as the present invention.

There are several scanning techniques known in the prior art to obtain the tri-level exposure imaging. A conventional flying spot scanner, such as used in the Canon 9030 uses a ROS unit to "write" an exposed image on a photoreceptive surface a pixel at a time. To obtain higher spatial resolution, a pulse imaging scanner can be utilized. This pulse imaging scanner is also referred to as a Scophony scanner in an article in *Optical Engineering*, Vol. 24, No. 1, Jan./Feb. 1985, pages 93 to 100, "Scophony Spatial Light Modulator", by Richard Johnson et al., whose contents are hereby incorporated by reference. A preferred technique, capable of higher spatial resolution is to use similar optical elements as the flying spot scanner (rotating polygon, laser light source, pre polygon and post polygon optics), but with an A/O modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD or color exposure.

In previous Scophony scanners, such as those disclosed in the above cited *Optical Engineering* article, the polygon facet itself functions as the spatial filter. However, a tri-level xerographic system is extremely power sensitive so the spatial filter within the raster output scanner must be more sensitive than merely the polygon facet.

The polygon facet also present problems with start of scan and end of scan spatial filtering while the polygon facet is spinning. A stationary spatial filter is preferable. The polygon facet as spatial filter does not provide a variable, adjustable filter. The polygon facet as spatial filter also does not permit adjusting of the frequency band that is to be reflected. The polygon facet as spatial filter does not correct for flare.

Overshoot, in the context of a tri-level xerographic system, is the unwanted power intensity above the intermediate level (all on white). In a highlight color tri-level xerographic system, black is the off level, white is the intermediate level, and color is the highest level.

Overshoot can cause print defects. When the overshoot or unwanted excess power intensity is severe enough, the prints acquire unintended color toner to appear on the page.

In a pulsed image system, the contrast of the pixel produced by the raster output scanner (ROS) is directly related to the overshoot. In a pulsed image ROS, contrast is controlled by the spatial filter. The spatial filter controls the contrast by allowing certain spatial frequencies to pass while blocking off some undesired frequencies.

It is an object of this invention to provide a non-polygon facet spatial filter in a pulsed imaging, pulse width modulation Raster Output Scanner for creating tri-level exposures to control overshoot and maintain precise intensity levels.

SUMMARY OF THE INVENTION

More particularly, the present invention relates to a pulsed imaging, non-facet tracked, pulse width modulation raster output scanner incorporating a spatial filter for creating tri-level exposures without overshoot on a recording medium comprising:

means for providing a coherent, focused beam of radiant energy, control circuit means for converting an image bit map video data stream into a composite analog video image data stream, an acousto-optic modulator for modulating said beam in response to said analog image video data stream simultaneously applied to the modulator to provide a modulated optical output, optical means for performing a Fourier transformation of the modulated optical output, an asymmetric spatial filtering means for limiting predetermined frequencies of the fourier transformed modulated optical output to produce a filtered optical output, and a rotatable scanning element interposed between said recording medium and said radiant energy source, said scanning element having a plurality of facets for intercepting the filtered optical output and repeatedly scanning said output across the surface of said recording medium to form the tri-level exposures.

Instead of obtaining an intermediate exposure level by controlling the acoustic amplitude, an intermediate exposure is provided by using pulse width modulation in a pulse imaging system in conjunction with spatial filtering. Use of a pulsed imaging scanner with pulse width modulation, however, may result in image quality problems. A separate asymmetric filter in the pre-polygon optics corrects for overshoot of the power intensity in the ROS.

DESCRIPTION OF THE PREFERRED EMBODIMENT

Figure 1:
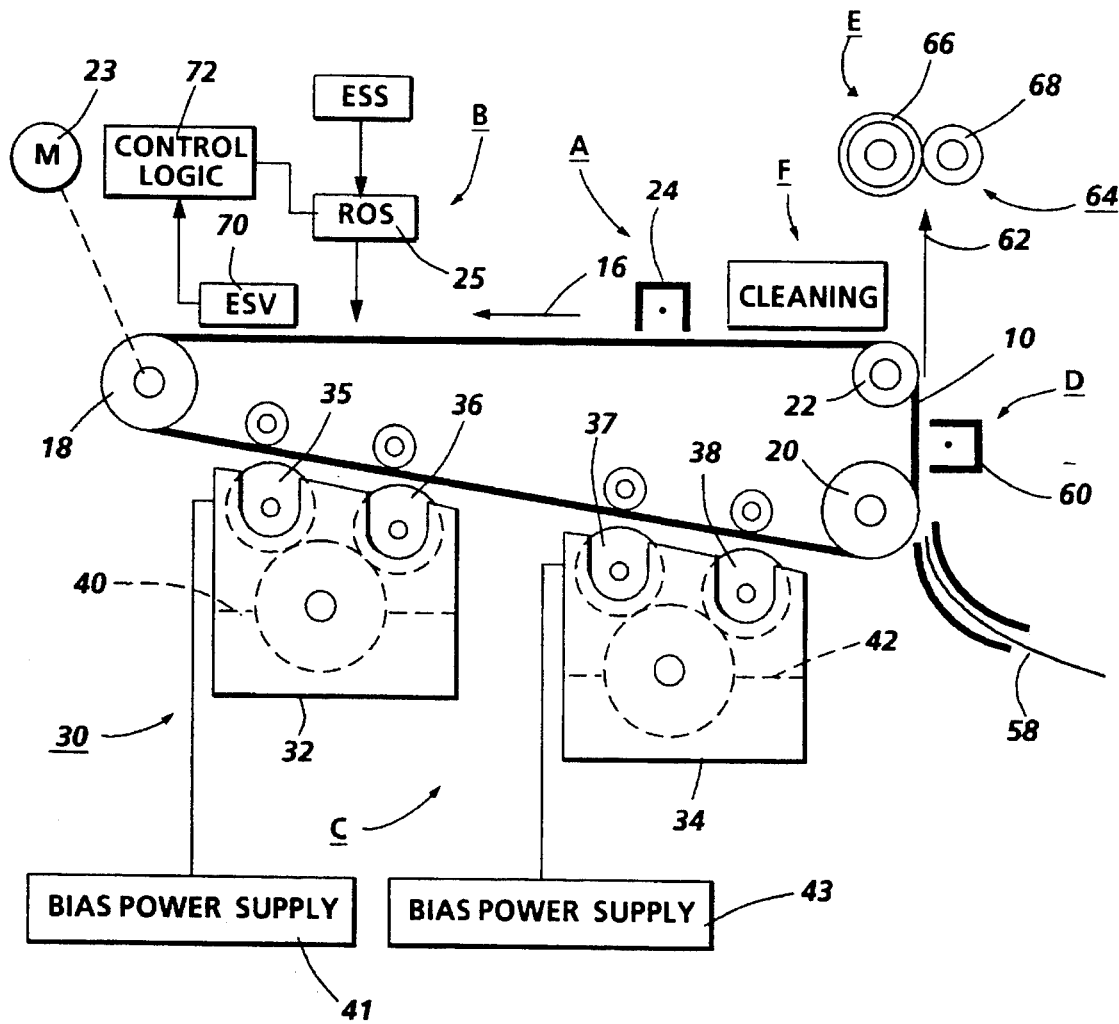
FIG. 1 is a schematic view of a prior art tri-level imaging system.
Figure 2A:
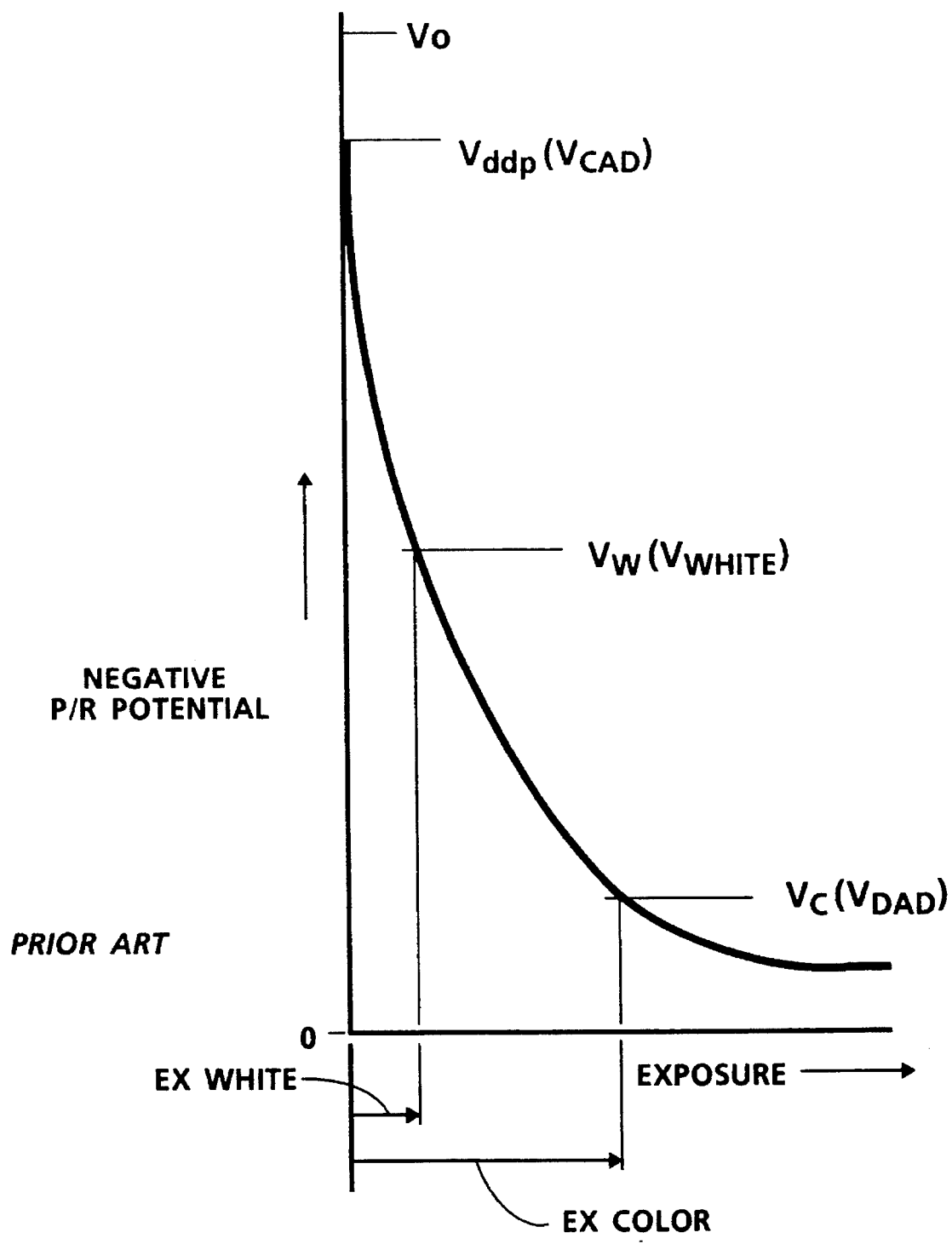
FIGS. 2a and 2b show three voltage discharge levels obtained by the exposure system of FIG. 1.
Figure 2B:
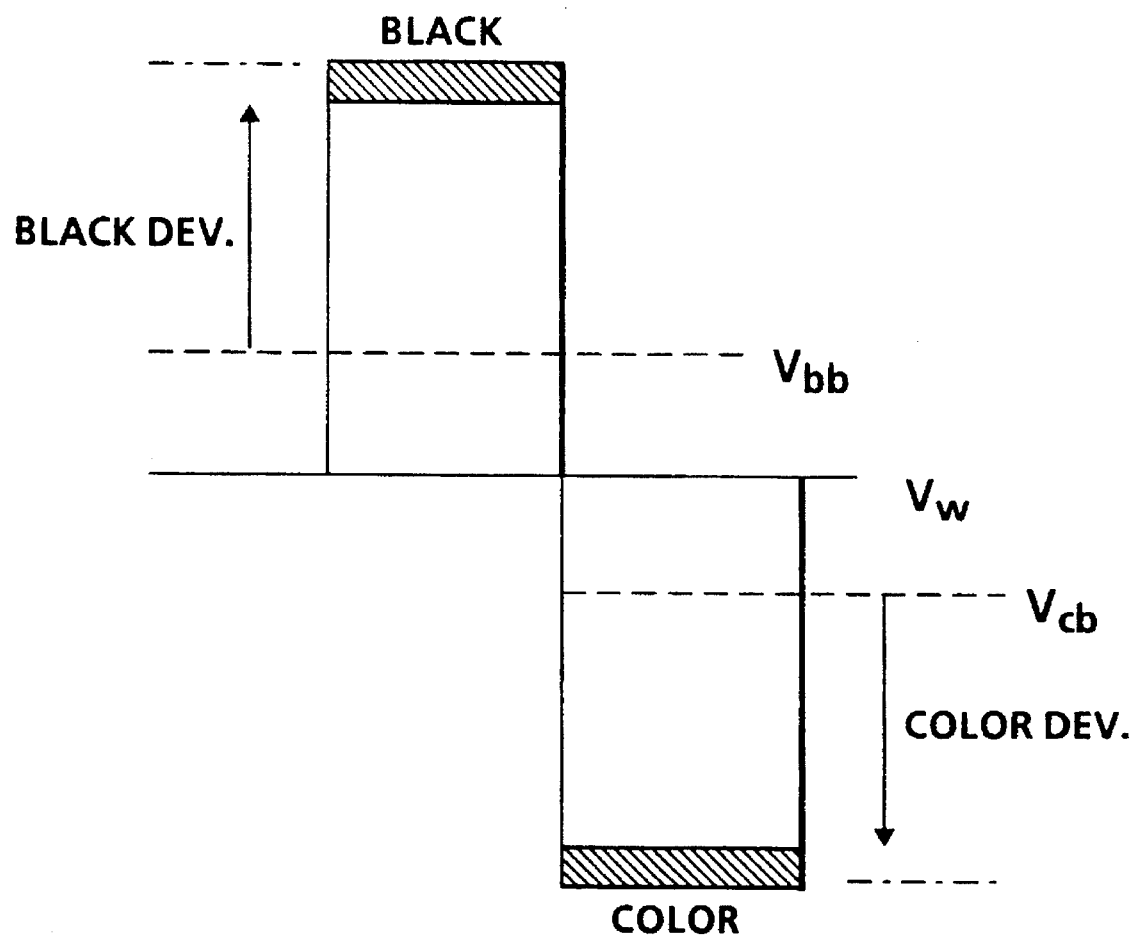
Figure 3:
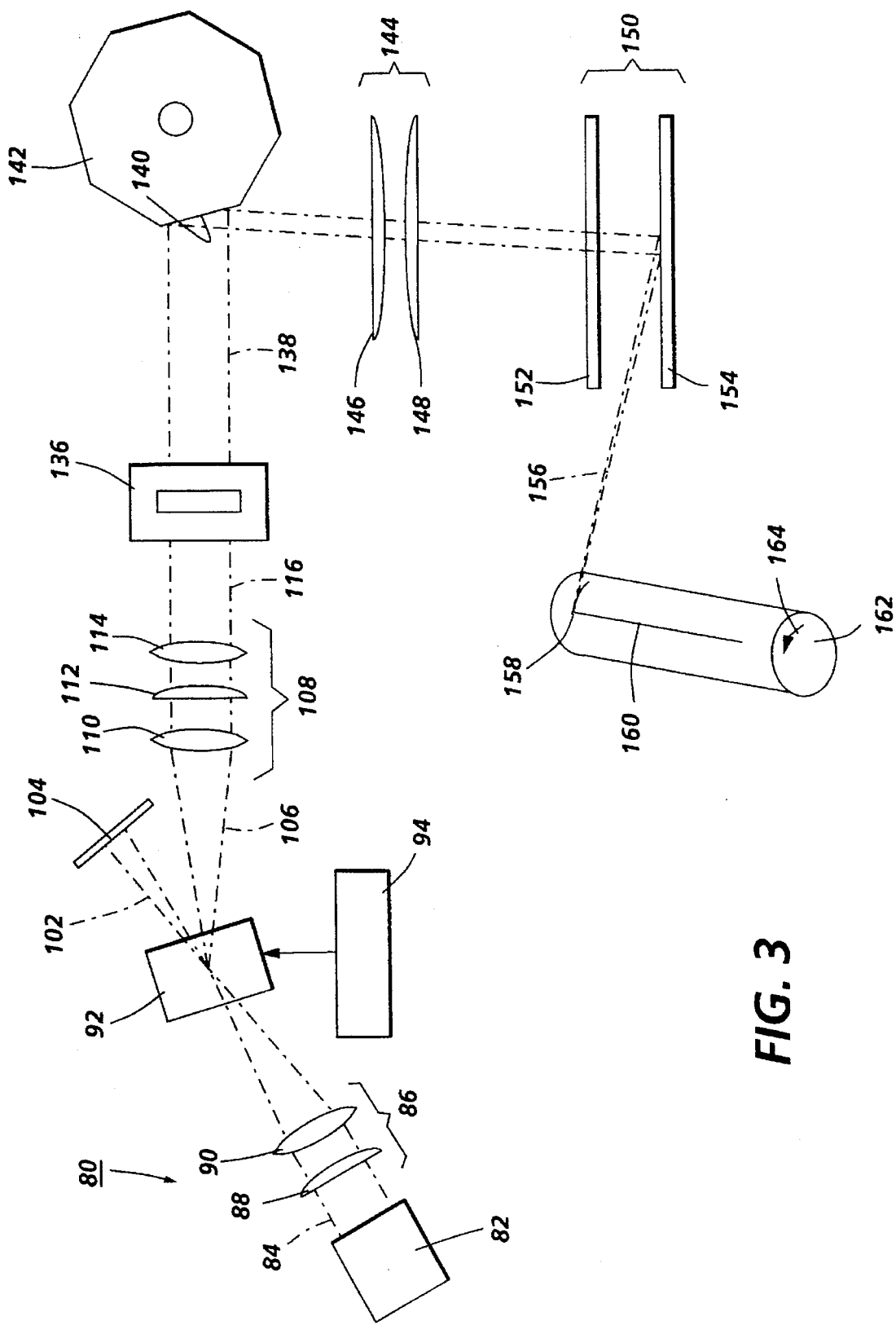
FIG. 3 is a schematic view of the pulsed imaging, pulse width modulation raster output scanner for tri-level exposure.

Reference is now made to FIG. 3 wherein there is disclosed a non-facet tracking, pulsed imaging raster output scanner 80 with pulse width modulation for tri-level exposure for a highlight color imaging system. The raster output scanner 80 uses a Scophony scanner architecture.

A light source 82 provides the original beam of light 84 for the scanner 80. The light source 82 is preferably a laser, such as a helium-cadmium laser or a helium-neon laser, which generates a collimated beam of monochromatic light 84. The monochromatic light beam is focused by a beam expander lens system 86 of a cylindrical lens 88 and a spherical lens 90 onto modulator 92.

The modulator 92 is an acousto-optic Bragg cell or, as it is more commonly called, an acousto-optic modulator. The acousto-optic modulator 92 is used to modulate the light beam 84 in accordance with the information contained in the electrical video signal supplied to the modulator 92 by control circuit 94.

The beam 84 is modulated by the individual bits of the pulse sequences of the video signal from the modulator control circuit 94. The control circuit 94 converts an image bitmap video data stream into an analog video data stream consisting of a plurality of pixel periods.

Figure 4A:
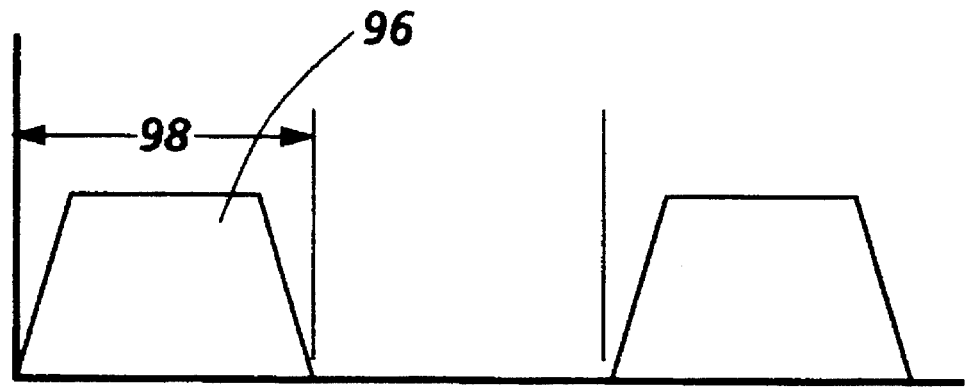
FIG. 4A is a schematic view is the video pulse sequence for one bit on/one bit off for a full width pulse.
Figure 4B:
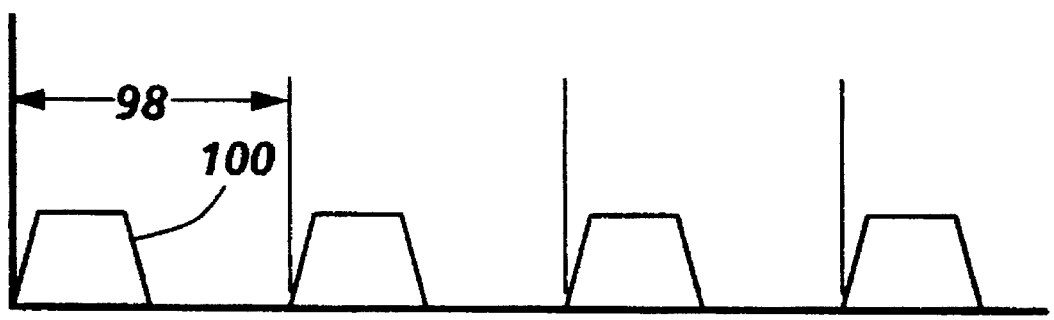
FIG. 4B is a schematic view is the video pulse sequence for one bit on/one bit off for a partial width pulse.

The simplest and fastest video pulse sequence for the video data stream is one bit on/one bit off as shown in FIG. 4A. The pulse 96 takes up the full width 98 of the pulse sequence to form a full pulse width. A pulse 100 in FIG. 4B (still in the one bit on/one bit off pattern) which does not fill the full width 98 of the pulse sequence is a partial pulse width or pulse width modulated. The partial pulse can be any percent of the full width 98 of the pulse sequence from 0% to 100%, although 15% to 70% is preferable, and 50% is illustrated in FIG. 4B.

When pulse width modulation is being applied to reduce the exposure level of a string of "on" pixels, the average light level that passes through the modulator is proportional to the duty cycle of the pulse stream. However, since the sideband energy does not pass beyond the facet, the average light level is further reduced, the actual reduction depending on the higher harmonic content that is passed to the acoustic wave. In practice, it can be expected that pulse width modulation at a 50% duty cycle will result in an exposure level of about 25%.

The video bit pulse sequence is translated into individual acoustic pulses in sequence in the modulator 92 which in turn modulates the light beam 84.

The collimated beam of light 84 is modulated by modulator 92. Without a video signal applied to the modulator 92 by control circuit 94, only a non-diffracted, zero order output beam 102 is produced. The non-diffracted beam 102 is absorbed by a beam stop 104 for printing a uniform zero exposure along the scan line of the recording medium.

Typically, application of a video signal to the modulator 92 by the control circuit 94 will produce two significant output beams: a first-order, modulated beam 106 and the zero-order, non-diffracted, nonmodulated beam 102 which is absorbed by the beam stop 104. The modulated beam 106 has a spatial profile defined by the video bit signal pulse and a spatial intensity which is a function of the amplitude of the video signal applied to the modulator. The pulse width narrowed video signals which have been pulse width modulated become spatially narrow optical pulses.

The modulated beam 106 from the modulator 92 is recollimated by an anamorphic lens system 108. The anamorphic lens system 108 consists of a spherical lens 110, a cylindrical lens 112 and a spherical lens 114. The anamorphic lens system 108 also performs a fourier transform on the fast scan plane portion of the modulated beam 106 to form a fourier transformed, modulated beam 116.

Figure 5A:
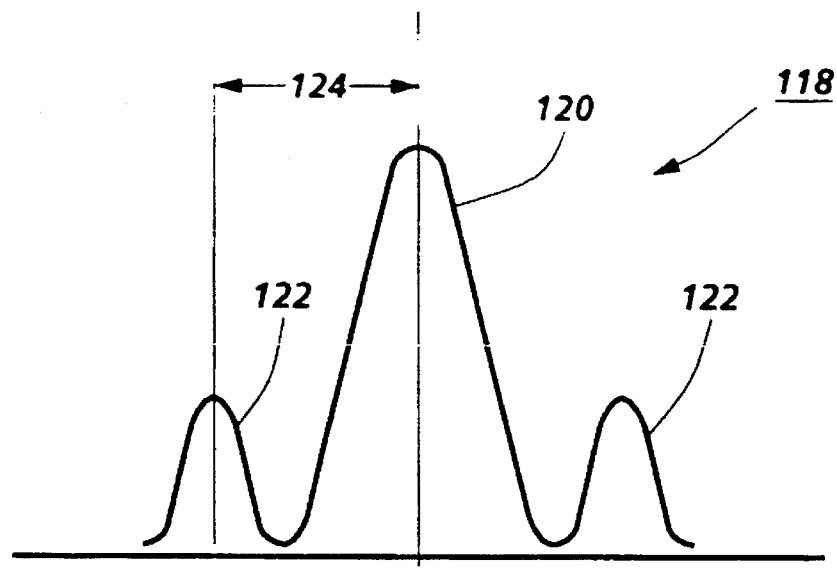
FIG. 5A is a schematic view of the intensity profile of the fourier transform of the full width pulse of FIG. 4A.

The full pulse width beam of FIG. 4A after recollimation and fourier transformation by the anamorphic lens system will produce an intensity profile 118 in the Fourier plane as shown in FIG. 5A. The intensity profile 118 has a single central lobe 120 and two side lobes 122.

The spacing 124 between a side lobe 122 and the central lobe 120 is described by the equation ($f_0$ W EFL) where $f_0$ is the spatial frequency of the video pattern, W is the wavelength of light and EFL is the effective focal length of the anamorphic lens system 108.

Figure 5B:
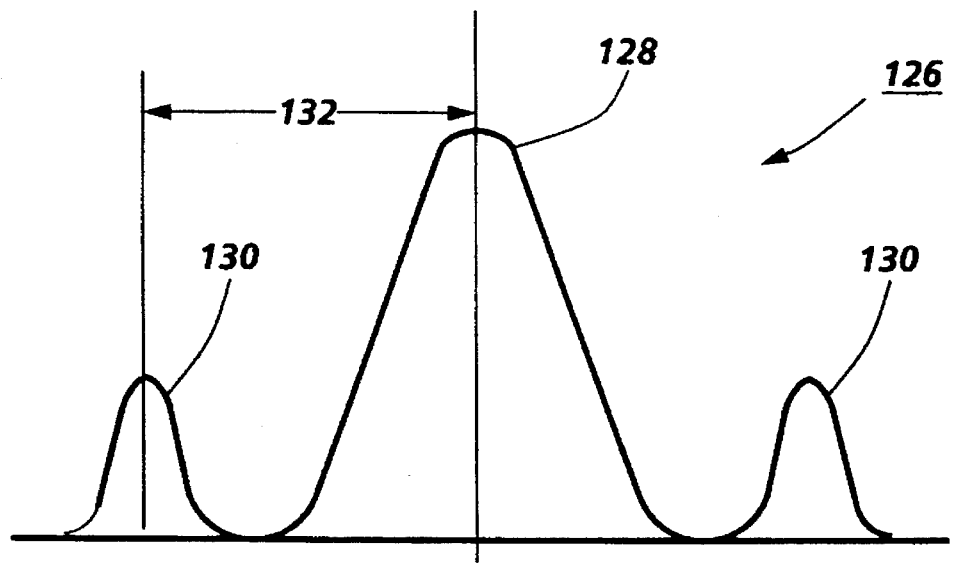
FIG. 5B is a schematic view of the intensity profile of the fourier transform of the partial width pulse of FIG. 4B.

The partial pulse width beam or pulse width modulated beam of FIG. 4B after recollimation and fourier transformation by the anamorphic lens system will produce a intensity profile 126 in FIG. 5B similar to the intensity profile 118 in FIG. 5A. The partial pulse 100 of FIG. 4B is only a fractional width of the full pulse 96 of FIG. 5A.

The intensity profile 126 in FIG. 5B also has a single central lobe 128 and two side lobes 130. However, the spacing 132 in FIG. 5B between a side lobe 130 and the central lobe 138, using the equation ($f_0$ W EFL), is twice as large as the spacing 124 in FIG. 5A. The spatial frequency of the partial pulse 100 is twice that of the full pulse 96 in the one bit on/one bit off pulse pattern. As previously stated, the partial pulse 100 is 50% of the full pulse 96, so that the frequency of the one bit on/one bit off pattern is twice.

Figure 6A:
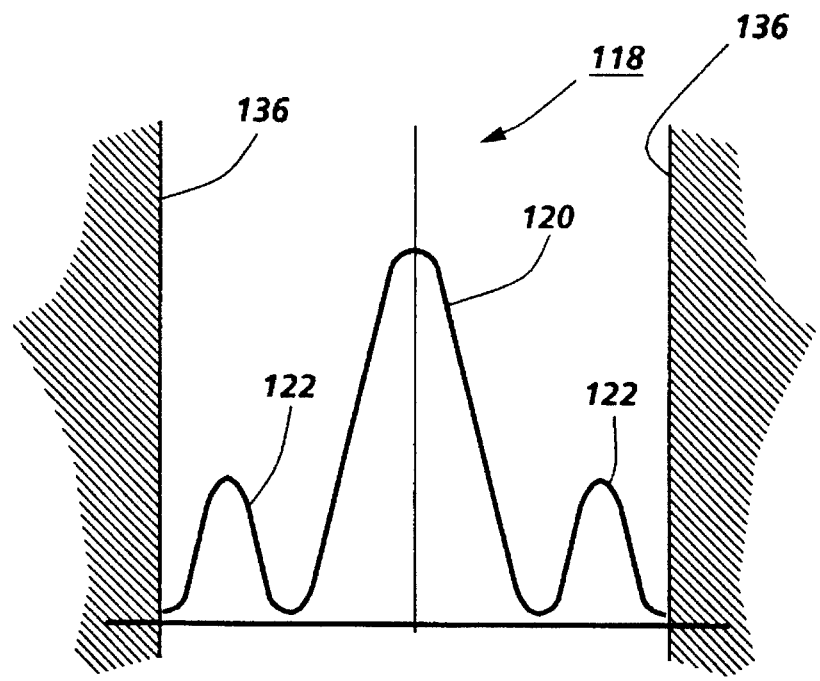
FIG. 6A is a schematic view of the intensity profile of the full width pulse of FIG. 5A after being filtered through a spatial filter.
Figure 6B:
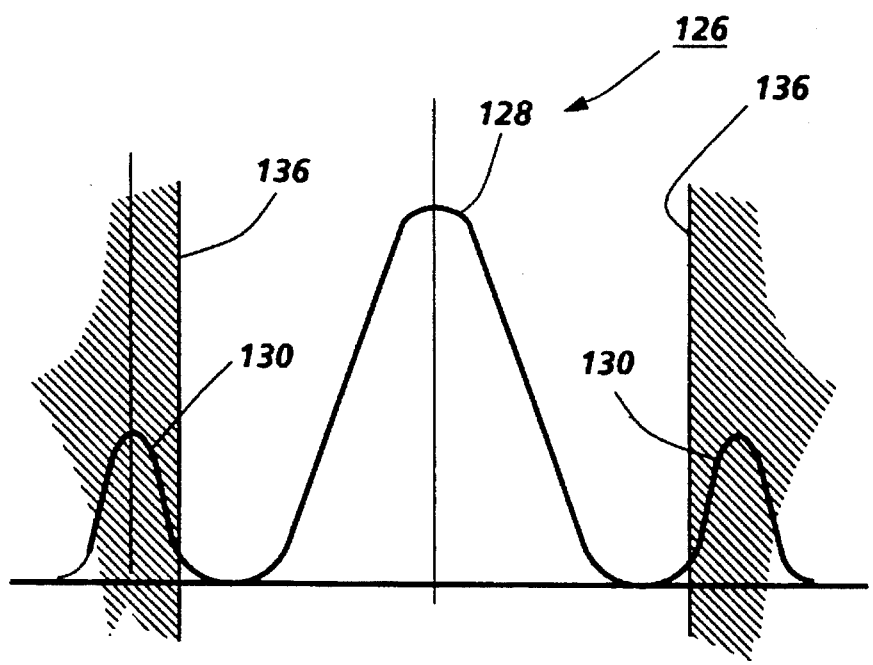
FIG. 6B is a schematic view of the intensity profile of the partial width pulse of FIG. 5B after being filtered through a spatial filter.

The fourier transformed, modulated beam 16 is then filtered by a spatial frequency bandpass filter 136. The spatial filter 136, which can be a simple slot filter, will block the farther spaced apart side lobes 130 of the intensity profile 126 of the partial pulse width modulated beam as shown in FIG. 6B while allowing the closer spaced side lobes 122 of the full pulse width beam to pass through the filter 136 as shown in FIG. 6A.

The limited size of the slot acts as a Fourier plane spatial frequency bandpass filter that limits the upper frequency that is reflected to the photoreceptor. In FIG. 6B, it is seen that the frequency associated with a 1-on/1-off pattern is passed through the optical system, thereby allowing printing of that frequency. In FIG. 6A shows the diffraction pattern for printing a uniform intermediate exposure. The pulse width modulated video pattern is turned on and off for each pixel, with the on time corresponding to the desired exposure level. The frequency of this pattern is twice that of the 1-on/1-off pattern and thus, the associated diffraction lobes are blocked by the spatial filter. This spatial frequency filtering of the optical signal results in a uniform intermediate level output.

Thus, the intensity profile 118 of the full pulse width beam will be at full intensity from the central lobe and the two side lobes for printing a uniform full exposure along the scan line of the recording medium. The spatially filtered intensity profile 126 of the partial pulse width modulated beam will contain only the central lobe for printing at a lower, partial intensity the same pattern (one bit on/one bit off in this example) as the full width pulse beam. The spatially filtered intensity profile 126 of the partial pulse width modulated beam will print a uniform intermediate exposure along the scan line of the recording medium. The intermediate exposure level is obtained from the pulse width narrowed video signals which become spatially narrow optical pulses exiting the modulator and are filtered by the spatial filter to result in a low uniform exposure at the recording medium.

The spatial filter 136 is stationary in the optical path since the raster output scanner 80 is non-facet tracking and the beam 116 is not moving to track the rotating polygon mirror facet. The modulated, collimated, fourier-transformed, filtered beam 138 from the spatial filter 136 is reflected from the facet 140 of the rotating polygon mirror 142 through a scan angle from the rotation of the polygon facets.

The reflected beam 138 passes through a f-theta lens system 144 of a negative cylindrical lens 146 and a positive cylindrical lens 148 for focusing the beam in the fast scan plane. The beam then passes through a wobble correction system 150 consisting of a cylindrical lens 152 and a cylindrical mirror 154 for correcting for wobble in the slow scan plane.

The f-theta lens system 144 and wobble correction system 150 focus the resulting beam 156 at a point 158 along a scan line 160 along the surface of a recording medium 162 which is sensitive to the spatial intensity profile of the beam. As shown, medium 162 is preferably a xerographic drum which is rotated in the direction of arrow 164 to provide the Y direction of scan. The recording medium can be the photosensitive medium of a photoreceptor As noted previously, the fourier transform by the anamorphic lens system 108 and the subsequent filtering by the spatial filter 136 results in a uniform exposure of the spatial intensity of the beam 156 as either full exposure, intermediate exposure or zero exposure at the recording medium 162. The intermediate exposure level is obtained from the pulse width narrowed video signals which become spatially narrow optical pulses exiting the modulator 92 and are filtered by spatial filter 136 to result in a low uniform exposure at the recording medium 162. The zero exposure level is obtained from a non-modulated beam which exits the modulator and is blocked by the beam stop.

In this configuration, an image of an acousto-optic video stream from the acousto-optic modulator is imaged to the recording medium. The imaging optics are composed of a set of anamorphic pre-polygon optics and f-theta post-polygon scan optics. The rotating polygon is placed at the back focal plane of the set of scan optics and at the front focal plane of the pre-polygon optics.

The rotating polygon causes the optical image of the acousto-optic video pattern to sweep across the scan line of the recording medium with a certain velocity in addition to the image velocity. Acoustic image motion at the surface of the recording medium which, if uncorrected, would blur the optical image, is canceled by balancing the acoustic and scan velocities with the pre-polygon and post-polygon optics magnification, resulting in the acoustic image remaining stationary on the recording medium.

Figure 7:
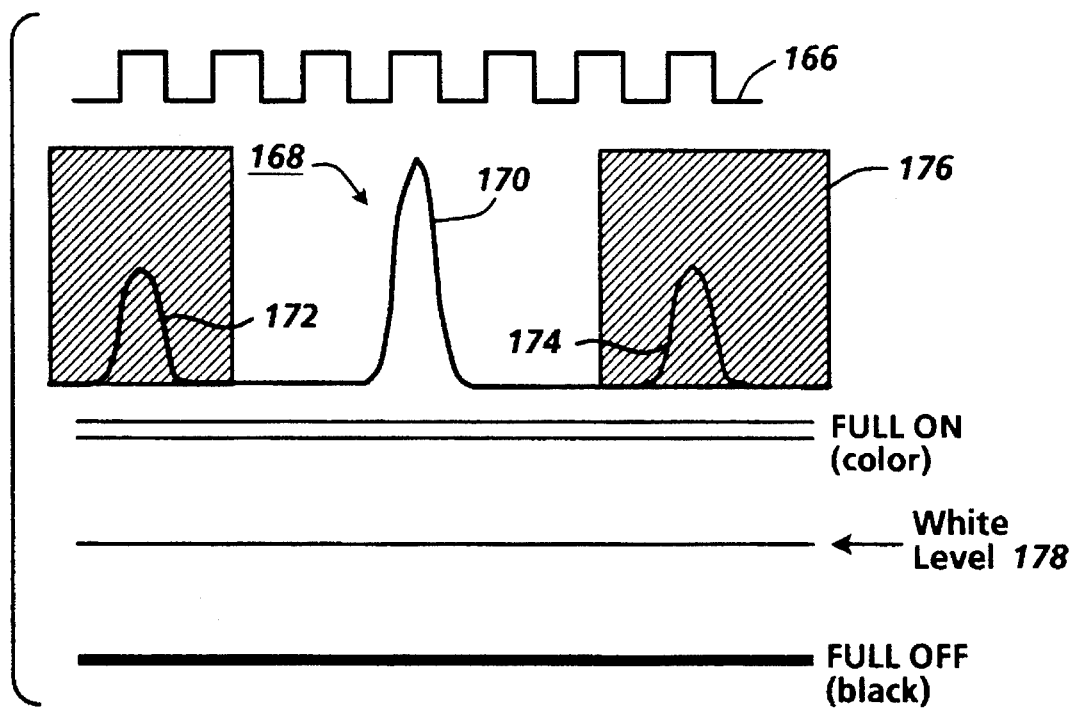
FIG. 7 is a schematic view of a white pulse width signal sequence, the corresponding fourier transform, the effect of a symmetric spatial filter and the resulting filtered exposure.

A white pulse width modulated signal sequence 166 in FIG. 7 has a fourier transform, modulated intensity profile 168 with a single central lobe 170 and two side lobes 172 and 174. The symmetric spatial frequency bandpass filter 176 will block the two side lobes 172 and 174 of the intensity profile 168 while allowing the central lobe 170 to pass through the filter 176. The central lobe 170 of the fourier transform, modulated intensity profile 168 will produce an intermediate or white exposure 178 in the tri-level xerographic system.

Figure 8:
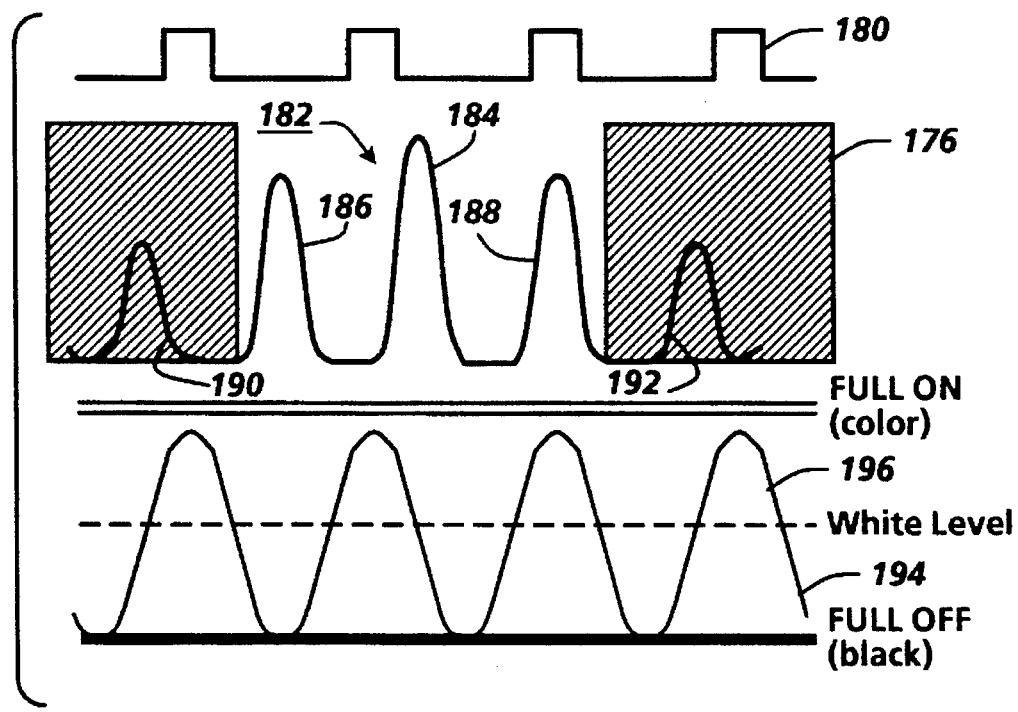
FIG. 8 is a schematic view of a white pulse width signal sequence, the corresponding fourier transform, the effect of an asymmetric spatial filter and the resulting filtered exposure.

A one-white, one-black pulse width modulated signal sequence 180 in FIG. 8 has a fourier transform, modulated intensity profile 182 with a single central lobe 184, two closely spaced side lobes 186 and 188 and two farther spaced side lobes 190 and 192. The symmetric spatial frequency bandpass filter 176 will block the two farther spaced side lobes 190 and 192 of the intensity profile 182 while allowing the central lobe 184 and the two closely spaced side lobes 186 and 188 to pass through the filter 176. The central lobe 184 and the two closely spaced side lobes 186 and 188 of the fourier transform, modulated intensity profile 182 will produce a sinusoidal exposure 194 centered as an intermediate or white exposure but with overshoot 196 into the full exposure or color level exposure in the tri-level xerographic system.

Figure 9:
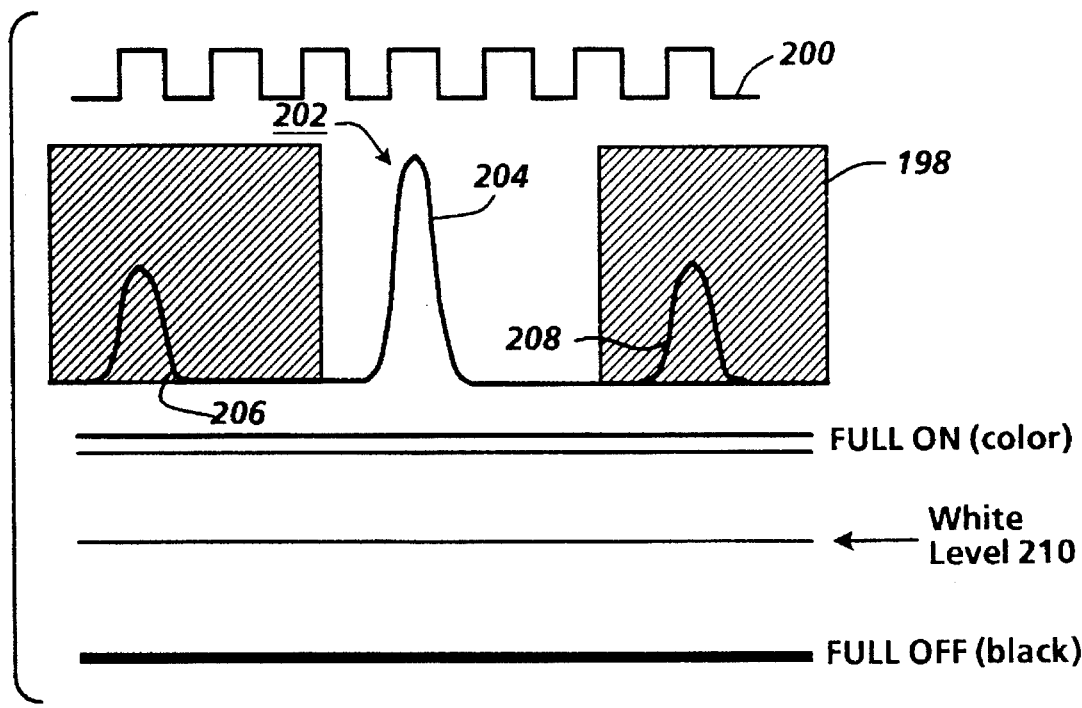
FIG. 9 is a schematic view of a one-white, one-black pulse width signal sequence, the corresponding fourier transform, the effect of an asymmetric spatial filter and the resulting filtered exposure.
Figure 10:
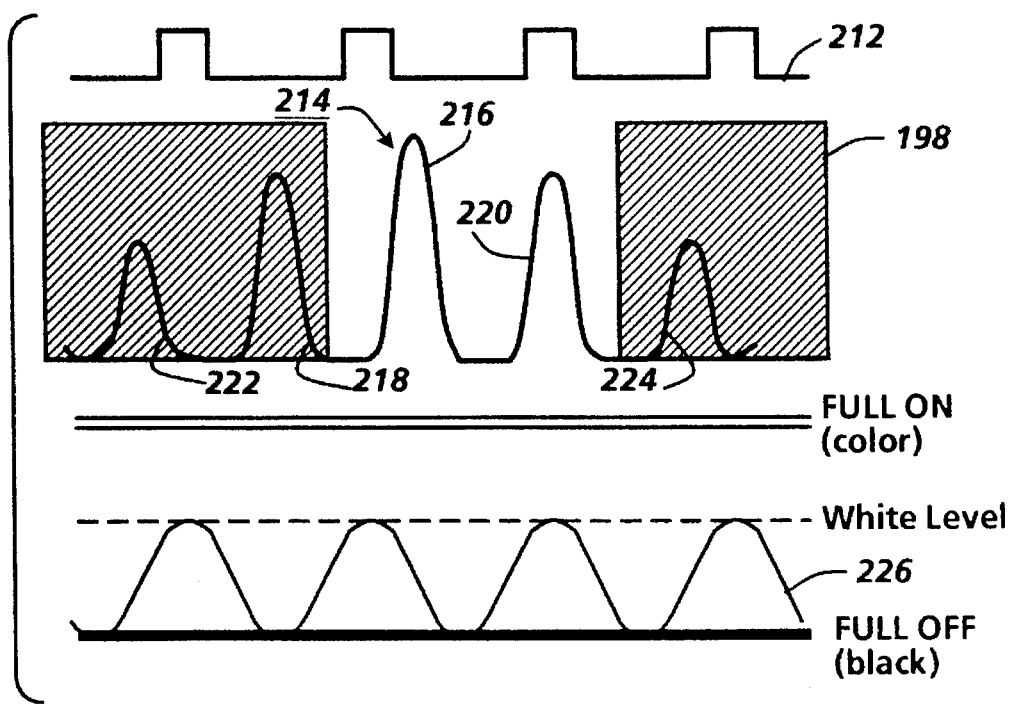
FIG. 10 is a schematic view of a one-white, one-black pulse width signal sequence, the corresponding fourier transform, the effect of an asymmetric spatial filter and the resulting filtered exposure.

An asymmetric spatial frequency bandpass filter 198 of FIGS. 9 and 10 reduces the overshoot in the tri-level xerographic system.

A white pulse width modulated signal sequence 200 in FIG. 9 has a fourier transform, modulated intensity profile 202 with a single central lobe 204 and two side lobes 206 and 208. The intensity profile is not centered symmetrically within the spatial frequency bandpass filter 198. The central lobe 204 of the intensity profile 202 is not centered within the spatial frequency bandpass filter 198. Rather, the spatial frequency bandpass filter 198 is asymmetrical with respect to the fourier transform, modulated intensity profile 202.

However, the asymmetric spatial frequency bandpass filter 198 will block the two side lobes 206 and 208 of the intensity profile 202 while allowing the central lobe 204 to pass through the filter 198. The central lobe 204 of the fourier transform, modulated intensity profile 202 will produce an intermediate or white exposure 210 in the tri-level xerographic system.

A one-white, one-black pulse width modulated signal sequence 212 in FIG. 10 has a fourier transform, modulated intensity profile 214 with a single central lobe 216, two closely spaced side lobes 218 and 220 and two farther spaced side lobes 222 and 224. The intensity profile 214 is not centered symmetrically within the spatial frequency bandpass filter 198. The central lobe 216 of the intensity profile 214 is not centered within the spatial frequency bandpass filter 198. Rather, the spatial frequency bandpass filter 198 is asymmetrical with respect to the fourier transform, modulated intensity profile 214.

The asymmetric spatial frequency bandpass filter 198 will block the two farther spaced side lobes 222 and 224 and one of the closely spaced side lobes 218 of the intensity profile 214 while allowing the central lobe 216 and one of the closely spaced side lobes 220 to pass through the filter 198. The central lobe 216 and the one closely spaced side lobe 220 of the fourier transform, modulated intensity profile 214 will produce a sinusoidal exposure 226 centered as an intermediate or white exposure but without overshoot into the full exposure or color level exposure in the tri-level xerographic system.

The asymmetric frequency bandpass spatial filter will greatly reduce the overshoot above the intermediate or white level of the tri-level xerographic system. This reduction in overshoot is achieved by reducing the overall energy transmitted by removing one of the side lobes without eliminating the necessary modulation frequency of the signal.

The spatial filter 136 of FIG. 3 can be a liquid crystal spatial frequency bandpass filter. The spatial filter 136 can be positioned anywhere along the optical path between the anamorphic lens system 108 and the f-theta lens system 144. The key factor is the beam to be filtered must be fourier transformed and collimated in the fast scan plane. The beam after the reflection from the polygon facet is moving through a scan angle. A spatial filter positioned between the polygon mirror and the f-theta lens system, therefore, would have to move in synchronization with the beam. A slot filter could be physically moved or the aperture image could be moved in a stationary liquid crystal filter.

The one bit on/one bit off pulse pattern is used as an illustrative example. Other bit pulse patterns from the video drive signal can be used to form pulsed imaging. Other bit pulse patterns will have different spatial intensity profiles after fourier transformation but the profiles will still consist of a pattern of lobes. Pulse width modulation to form partial width pulses will have side lobes father spaced apart after fourier transform. Some of these spaced lobes will be blocked by the spatial filter yielding partial intensity or intermediate exposure along the scan line of the recording medium. The exact bit pulse pattern effects only the pattern of the exposure. The exact bit pulse pattern does not effect the uniformity of the exposure level nor whether it is a full exposure level or an intermediate exposure level.

Since the modulator is not facet-tracking in a non-facet tracking scanner architecture, there is no modulator roll off of the imaging beam. If the modulator carrier frequency is kept constant at 105 MHz, a frequency which will not beat adversely with the modulated pulses, optical power fluctuations will be alleviated. The polygon size is increased to account for the non-facet tracking architecture to sufficiently to pass all relevant spatial information to the photoreceptor.

While the invention has been described with reference to the structures disclosed, it is not confined to the details set forth but is intended to cover such modifications or changes as they come within the scope of the following claims.

What is claimed is:

1. A pulsed imaging, non-facet tracked, pulse width modulation raster output scanner for creating tri-level exposures without overshoot on a recording medium comprising:

means for providing a coherent, focused beam of radiant energy, control circuit means for converting an image bit map video data stream into a composite analog video image data stream, an acousto-optic modulator for modulating said beam in response to said analog image video data stream simultaneously applied to the modulator to provide a modulated optical output, an optical means for performing a Fourier transformation of the modulated optical output, an asymmetric spatial filtering means for limiting predetermined frequencies of the fourier transformed modulated optical output to produce a filtered optical output, and a rotatable scanning element interposed between said recording medium and said radiant energy source, said scanning element having a plurality of facets for intercepting the filtered optical output and repeatedly scanning said output across the surface of said recording medium to form the tri-level exposures.

2. A pulsed imaging, pulse width modulation raster output scanner which exposes three exposure levels without overshoot comprising:

means for providing a coherent, focused beam of radiant energy, means for generating pulse width modulated image video data signals contained within three associated pixel periods, acousto-optic type modulator means for modulating said beam in accordance with the information content of said data signals, and polygon scanning means interposed between said modulator and said recording medium, said scanning means having a plurality of facets for intercepting said beam to repeatedly scan said beam across said recording medium in a fast scan direction, and asymmetric spatial filtering means adapted to act as a side band filter to those portions of the modulated beam corresponding to said pulse width modulated data signals to reduce the overall illumination intensity of said pulse width modulated data signals, whereby the recording medium surface is exposed at three exposures levels: a zero exposure, a full exposure and, an intermediate exposure level.

3. A pulsed imaging, non-facet tracked, pulse width modulation raster output scanner incorporating an asymmetrical spatial filter for creating tri-level exposures without overshoot on a recording medium comprising:

- a light source for providing a collimated, coherent beam of light,
- an acousto-optic modulator for modulating said coherent beam in response to pulse width modulated signals,
- an acousto-optic modulator control circuit for providing said pulse width modulated signals to said acousto-optic modulator,
- an anamorphic lens system for recollimating and performing a fourier transformation on said modulated beam,
- an asymmetric spatial filtering means for limiting predetermined frequencies of said fourier transformed beam, and
- a rotating polygon mirror having a plurality of facets for scanning said filtered beam through a scan angle across a line on said recording medium.

4. The pulsed imaging, non-facet tracked, pulse width modulation raster output scanner incorporating an asymmetrical spatial filter for creating tri-level exposures without overshoot on a recording medium of claim 3 wherein said asymmetric spatial filtering means is a slot filter.

5. The pulsed imaging, non-facet tracked, pulse width modulation raster output scanner incorporating an asymmetrical spatial filter for creating tri-level exposures without overshoot on a recording medium of claim 3 wherein said asymmetric spatial filtering means is a liquid crystal filter.

6. A pulsed imaging, non-facet tracked, pulse width modulation raster output scanner incorporating a spatial filter for creating tri-level exposures on a recording medium comprising:

- a laser source for providing a collimated, coherent beam of light,
- a beam expanding lens system consisting of a cylindrical lens and a spherical lens for focusing said collimated beam,
- an acousto-optic modulator for modulating said focused beam in response to pulse width modulated signals,
- an acousto-optic modulator control circuit for providing said pulse width modulated signals to said acousto-optic modulator,
- an anamorphic lens system consisting of a spherical lens, a cylindrical lens and a spherical lens for recollimating and performing a fourier transformation of said modulated beam in the fast scan plane,
- an asymmetric spatial slot filter for limiting predetermined frequencies of said fourier transformed beam,
- a rotating polygon mirror having a plurality of facets for scanning said filtered beam through a scan angle,
- a f-theta lens system consisting of two cylindrical lens for focusing said scanning beam in the fast scan plane across a line on said recording medium, and
- a wobble correction lens system consisting a cylindrical lens and a cylindrical mirror for focusing said scanning beam in the slow scan plane across a line on said recording medium.

* * * * *